United States Patent Office 3,036,958
Patented May 29, 1962

3,036,958
PROCESS FOR PRODUCING L-TRYPTOPHAN FROM 3-INDOLEPYRUVIC ACID
Toshinobu Asai, Ko Aida, Kazuaki Iizuka, and Tadayuki Kajiwara, all of Tokyo, Japan, assignors to Ajinomoto Kabushiki Kaisha, Tokyo, Japan
No Drawing. Filed Mar. 2, 1960, Ser. No. 12,286
Claims priority, application Japan Mar. 17, 1959
6 Claims. (Cl. 195—29)

The present invention relates to a process for producing L-tryptophan, one of the essential amino acids for nutrition, easily and economically on an industrial scale.

It has been known heretofore to obtain L-tryptaphan by hydrolysis of natural protein containing tryptophan or by producing L-tryptophan by chemical synthesis or enzymatic transamination.

We have now discovered that L-tryptophan can be produced by biological reductive amination instead of transamination from 3-indolepyruvic acid and amino group sources by utilizing the enzymatic activity of certain microorganisms, we have succeeded in producing easily and economically L-tryptophan on a commercial scale by a process based on said discovery.

We have made a search for microorganisms which have the strong enzymatic activity for the production of L-tryptophan from 3-indolepyruvic acid and amino group sources and have found that microorganisms belonging to species of genera Micrococcus, Serratia, Flavobacterium, Pseudomonas, Bacillus, Escherichia and Aerobacter and particularly Micrococcus and Serratia, have the strong enzymatic activity required.

The enzymatic activity acts on 3-indolepyruvic acid effectively to give L-tryptophan in a high yield when an aqueous solution containing 3-indolepyruvic acid and amino group source is added to the cells of microorganisms mentioned above as the source of enzyme of high activity and maintained at a temperature from 25° C. to 40° C. under a neutral to slightly alkaline condition. In this reaction, however, it is necessary to add a hydrogen-donating reagent and magnesium ions in order to secure the smooth proceeding of the reaction.

The concentration of 3-indolepyruvic acid in the aqueous solution may be varied in wide range but it is preferable to select it within the range 0.1–10% for commercial production from the viewpoint of L-tryptophan yield. For the amino group source, ammonium salts, particularly ammonium chloride and ammonium nitrate, and urea are suitable, for they are easily available and give a high yield. Theoretically, if the amino group source is present in the aqueous solution at the ratio of one amino group to one molecule of 3-indolepyruvic acid, it is sufficient, but practically it is preferable to use an excessive amount of amino group source and the suitable amount of ammonium chloride or ammonium nitrate is 1–4 mols and that of urea is 0.5–2 mols per 1 mol of 3-indolepyruvic acid.

In the reaction of the present invention, as the source of enzyme, the cells of the microorganisms mentioned above can be used in the dried state, intact state, and, in the state of the cultured broth containing the cells. The amount of cells to be added is not critical but the range of 0.2–7% by weight on the basis of dried cells of the aqueous solution is preferable.

When intact cells or cultured broth is used, the yield may be remarkably increased by adding a surface-active agent. It is considered that this is due to the fact that the permeability of the cell membrane is promoted by the surface-active agent.

The following table sets forth the results of the tests conducted using certain microorganisms as the enzyme source under same conditions excepting the use and non-use of a surface-active agent. This table shows clearly the effect of the presence of a surface-active agent.

| Microorganism used | Surface-active agent used | Yield of L-tryptophan, percent |
|---|---|---|
| Micrococcus lysodeikticus B-61-2 | Cetyl pyridium chloride | 30 |
| Do | non-use | 11 |
| Micrococcus luteus ATCC 398 | Cetyltrimethyl ammonium | 39 |
| Do | non-use | 23 |
| Cultured broth of Micrococcus lysodeikticus B-61-2 | Span 60 | 29 |
| Do | non-use | 24 |

For the hydrogen-donating reagent, monosaccharides, particularly glucose, and organic acids may be used, and it has been found that it is sufficient with the addition of about ⅓ mol of glucose per 1 mol of 3-indolepyruvic acid when glucose is used.

Magnesium may be added in the form of a salt, for example, of magnesium sulfate, and its function is to activate the enzyme of the microorganisms. It is sufficient with the addition of a relatively small amount of magnesium.

The cells of the microorganisms used in the present invention can be obtained by usual cultivation process known in the art. For example, they can be advantageously obtained by preparing a medium containing carbon source (sugars such as glucose, fructose, lactose, maltose, cane sugar or pentose, organic acids such as citric acid or tartaric acid), nitrogen source (organic materials such as soya bean cake, fish metal, casein, peptone, meat extract, yeast extract and/or inorganic materials containing nitrogen such as ammonium chloride, ammonium nitrate and ammonium sulfate), adding a strain of the microorganism to the medium and aerobically culturing the microorganism at a temperature 25° C.–40° C. for about 10–80 hours.

The isolation of the produced L-tryptophan can be easily attained by a conventional method, for example, by using ion-exchange resin.

Now the embodiments of the process of the present invention will be illustrated in the following.

*Example 1*

A reaction mixture was prepared by adding 1000 mg. of 3-indolepyruvic acid, 300 mg. of glucose, 800 mg. of $NH_4Cl$, 100 mg. of $K_2HPO_4$, 50 mg. of $MgSO_4 \cdot 7H_2O$ in 100 ml. of water and adjusting the pH to 8.0 with phosphate buffer solution. When about 400 mg. of dried cells of Micrococcus luteus ATCC 398 was added to the reaction mixture and this was maintained at about 30° C. for 10 hours under occasional shaking to carry out reaction, 504 mg. of L-tryptophan was produced. The yield was 50.4% on the basis of 3-indolepyruvic acid used.

After concentrating the reaction mixture in vacuum and adjusting the pH to 5.0 with diluted hydrochloric acid, the solution was passed through a column of non-ionic decolorizing resin "Permutit DR" to absorb L-tryptophan. The column was washed with water and then the L-tryptophan was eluted with 2% ammonia water. After evaporating and drying the eluate in vacuum, the residue was washed with a little volume of methanol and dried. 448 mg. of crude crystals of L-trytophan was obtained.

The dried cells used in the above process were those obtained by preparing a medium containing 2% glucose, 0.5% meat extract, 0.5% peptone, 0.3% yeast extract, 0.5% $NH_4Cl$, 0.5% NaCl, 0.05% $KH_2PO_4$, 0.01% $MgSO_4 \cdot 7H_2O$, and a little amount of $CaCl_2$ and having pH adjusted to 7.0, introducing 100 ml. of this medium into a 500 ml. shaking flask, sterilizing for 20 minutes at 120° C., inoculating *Micrococcus luteus* ATCC 398 cultured for 60 hours on bouillon-agar slope into the medium, culturing aerobically the inoculated microorganism for 18 hours at 30° C., separating the cells by centrifuging and drying the separated cells in a shale by putting the shale in a desiccator overnight.

*Example 2*

Using the same strain and the reaction mixture in Example 1 but replacing the inorganic nitrogen source in Example 1 with urea, 618 mg. of L-tryptophan was produced in the reaction mixture by the same process. The yield was 61.8%.

*Example 3*

Using *Micrococcus lysodeikticus* B-61-2 in place of *Micrococcus luteus* in Example 1, L-tryptophan was obtained in a yield of 55.8% by the same process as Example 1.

*Example 4*

Using a strain of *Serratia marcescens* in place of *M. luetus* in Example 1, reductive amination was conducted at various temperatures as set forth hereunder. The composition of the mixture used for the starting material, as well as the process employed was same as that in Example 1.

The results were as follows:

| Temperature | L-tryptophan formed | |
|---|---|---|
| | mg./ml. | Yield, percent |
| 20° C | 1.90 | 19.0 |
| 30° C | 3.87 | 38.7 |
| 37° C | 2.19 | 21.9 |
| 45° C | 1.49 | 14.9 |

*Example 5*

The process in Example 1 was repeated by using various other strains. The yields of L-tryptophan in respect of these microorganisms were as follows.

Strain:                           Yield (Percent)

(A) Genus Micrococcus—
    Micrococcus ureae _____ 31.7
    Micrococcus rubens _____ 19.6

(B) Genus Pseudomonas—
    Pseudomonas dacunhae _____ 10.2
    Pseudomonas riboflavinus _____ 10.8

(C) Genus Bacillus—
    Bacillus cereus _____ 21.5
    Bacillus megaterium _____ 7.8

(D) Genus Escherichia—*Escherichia coli* ___ 18.0

(E) Genus Aerobacter—
    Aerobacter cloacae _____ 26.3
    Aerobacter aerogenes _____ 19.0

(F) Genus Flavobacterium—*Flavobacterium arborescens* _____ 31.9

*Example 6*

*M. luteus* ATCC 398 was cultured in the same medium as that in Example 1 at 30° C. for 40 hours under occasional shaking. Cells of the microorganisms were separated with a centrifuge and settled at the bottom of the vessel to accumulate. The cells were washed and suspended in a M/15 phosphate buffer solution (pH=8.0) to prepare an intact cell suspension containing the cells at the rate of 50 mg./0.8 ml. of the solution calculated on the basis of the dried state. This cell suspension is referred hereinafter as "cell suspension."

An aqueous solution was separately prepared by dissolving 20 mg. 3-indolepyruvic acid, 16 mg. $NH_4Cl$, 6 mg. glucose, 2 mg. $K_2HPO_4$ and 1 mg. $MgSO_4 \cdot 7H_2O$ in 1 ml. water and adjusting the pH to 8.0 with $Na_2CO_3$.

0.8 ml. of "cell suspension" described above was mixed with the aqueous solution separately prepared, and after adding 0.2 ml. of 0.5% cetyl pyridium chloride aqueous solution (surface-active agent), the mixture was left standstill at 30° C. for 40 hours to carry out the reaction. L-tryptophan was produced in a yield of 41% based on 3-indolepyruvic acid used.

The same reaction was carried out under the same conditions but with no addition of surface-active agent. The yield was only 23%.

*Example 7*

*M. luteus* ATCC 398 was cultured in the same medium as that in Example 1 at 30° C. for 40 hours under shaking. The obtained cultured broth containing the cells was adjusted to pH 8.0 with $Na_2CO_3$.

An aqueous solution was separately prepared by dissolving 20 mg. 3-indolepyruvic acid, 16 mg. $NH_4Cl$, 6 mg. glucose, 2 mg. $K_2HPO_4$ and 1 mg. $MgSO_4 \cdot 7H_2O$ in 0.5 ml. water and adjusting pH to 8.0 with $Na_2CO_3$.

The prepared aqueous solution was mixed with 4 ml. of the adjusted cultured broth containing cells and after adding 0.2 ml. of 0.5% Tween 60 (surface-active agent), the mixture was left standstill at 30° C. for 40 hours to react. As the result, L-tryptophan was obtained in a yield of 43% based on 3-indolepyruvic acid.

The same reaction was repeated under the same conditions but with no addition of a surface-active agent. The yield was 35%.

*Example 8*

A M/15 phosphate buffer solution (pH=8.0) containing 1.0% 3-indolepyruvic acid, 0.3% glucose, 0.1% $KH_2PO_4$, 0.05% $MgSO_4 \cdot 7H_2O$, and 0.21% ammonium nitrate and added with 100 mg. of dried cells of *M. luteus* ATCC 398 cultured by the same way as in Example 1 was left standstill at 30° C. for 24 hours to react. The yield of L-tryptophan in relation to 3-indolepyruvic acid was 24.3%.

What we claim is:

1. A process for producing L-tryptophan from 3-indolepyruvic acid comprising reacting 3-indolepyruvic acid and an amino group source selected from the group consisting of ammonium salts and urea in an aqueous medium in the presence of cells of a microorganism selected from the group consisting of *Micrococcus lysodeikticus, M. luteus, M. ureae, M. rubens, Serratia marcescens, Flavobacterium arborescens, Pseudomonas dacunhae, Ps. riboflavinus, Bacillus cereus, B. megaterium, Escherichia coli, Aerobacter cloacae, A. aerogenes*, and a hydrogen donating reagent selected from the group consisting of monosaccharides and organic acids and $Mg^{++}$ with a neutral to slightly alkaline condition at 25° C.–40° C.

2. A process for producing L-tryptophan according to claim 1, wherein the cells of the microorganism are added in a state selected from the group consisting of dried cells, intact cells and cultured broth.

3. A process for producing L-tryptophan according to claim 1, wherein the cells of the microorganism other than in dried state are added to the reaction mixture together with a surface-active agent.

4. A process for producing L-tryptophan according to claim 1, wherein the amino group source is selected from the group consisting of ammonium chloride, ammonium nitrate and urea.

5. A process for producing L-tryptophan according to claim 1, wherein the hydrogen donating reagent is glucose.

6. A process for producing L-tryptophan from 3-indolepyruvic acid comprising preparing a reaction mixture containing of 0.1–10% 3-indolepyruvic acid by weight, an amino group containing material selected from the group consisting of ammonium salts and urea at a ratio of at least one amino group to one molecule of 3-indolepyruvic acid, a hydrogen donating reagent selected from the group consisting of monosaccharides, organic acids and magnesium salts in an amount sufficient for supplying Mg ions for the activation of the enzyme of a microorganism to be added, adjusting the pH of said mixture within the range of 7–9, adding cells of a microorganism selected from the group consisting of *Micrococcus lysodeikticus, M. luteus, M. ureae, M. rubens, Serratia marcescens, Flavobacterium arborescens, Pseudomonas dacunhae, Ps. riboflavinus, Bacillus cereus, B. megaterium, Escherichia coli, Aerobacter cloacae, A. aerogenes*, at the rate of 0.2–7% by weight on the basis of dried cells, maintaining the mixture at 25° C.–40° C. for a sufficient time for converting a substantial part of 3-indolepyruvic acid to L-tryptophan, and recovering produced L-tryptophan from the reaction mixture.

References Cited in the file of this patent

Sakurai article in J. Biochem. (Tokyo) vol. 44, pp. 47–50 (1957), abstracted in Chemical Abstracts, vol. 51, 8155f.

Kinoshita article in Proceedings of the International Symposium on Enzyme Chemistry, Tokyo-Kyoto, 1957, pp. 464–468. Published by Maruzen, Tokyo, 1958.